United States Patent Office 3,022,350
Patented Feb. 20, 1962

3,022,350
PYROLYSIS OF TRIALLYL BORANE
Paul F. Winternitz, New York, and Arrigo A. Carotti, Bronx, N.Y., assignors to Olin Mathieson Chemical Corporation, a corporation of Virginia
No Drawing. Filed Mar. 6, 1959, Ser. No. 797,808
2 Claims. (Cl. 260—606.5)

This invention relates to fuels and, more particularly, to solid organoboron fuels.

The fuels of this invention, when incorporated with suitable oxidizers such as ammonium perchlorate, potassium perchlorate, sodium perchlorate, ammonium nitrate, etc., yield solid propellants suitable for rocket power plants and other jet propelled devices. Such propellants burn with high flame speeds, have high heats of combustion and are of the high specific impulse type. The fuels of this invention, when incorporated with oxidizers, are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

According to this invention, solid organoboron fuels are prepared by the pyrolysis of triallylborane at elevated temperatures and pressures. The reaction temperature can be varied widely, generally being from about 150° C. to 500° C. and preferably from 250° C. to 450° C. The pressure can be varied from about 75 to 400 p.s.i.g. Advantageously the pyrolysis is carried out in the presence of an inert gas such as nitrogen, hydrogen, and the like. The reaction time usually varies from one to six hours or more.

The invention is more fully described in the examples which follow. The triallylborane used in the examples was synthesized by the action of boron trifluoride etherate, $BF_3 \cdot Et_2O$ on allyl magnesium bromide

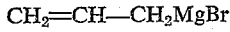

The Grignard reagent was prepared in the conventional manner by slowly adding allyl bromide

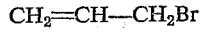

in ether solution to magnesium metal under anhydrous conditions. A small excess of magnesium metal was used and the mixture containing the Grignard reagent was allowed to reflux for about one to two hours after completion of the addition. To this mixture was added freshly prepared boron trifluoride etherate. The etherate was prepared by bubbling boron trifluoride gas into anhydrous diethyl ether, cooled in ice, until the solution was saturated. The Grignard reagent was present in the ratio 4:1, considerably exceeding the 3:1 stoichiometric ratio. The etherate was added slowly to maintain a steady reflux rate during the exothermic reaction. Towards the end of the addition, large amounts of solids formed a resistant sticky mass, which made stirring quite difficult. After the addition was complete, the mixture was refluxed for about two hours. Distillation of the product from this reaction mixture was performed immediately after this step, because triallylborane disproportionates on standing resulting in a lower yield of pure compound.

The mixture was cooled in Dry-Ice and the liquid portion decanted from the solids in a nitrogen atmosphere into an appropriate distilling or fractionating assembly. The ether was first distilled off together with other low-boiling compounds, possibly allyldifluoroborane. Following the removal of ether, there was a temperature rise and distillate was collected up to 114° C. This fraction represents a small portion of the total liquid and may contain diallylfluoroborane and small amounts of other substances. The fraction collected between 115 to 120° C. was practically pure triallylborane. A small amount of brownish liquid remained in the distilling flask. The 115 to 120° C. fraction was carefully fractionated and the fraction boiling at 116 to 117° C. was collected as the desired product. In three preparations, the yields of pure triallylborane were 48 percent, 48 percent and 47 percent.

The boiling point of triallylborane is 116 to 117° C. From vapor pressure data it was calculated to be 116.1° C. at 766.6 mm. of mercury. The refractive index of triallylborane is 1.3841, the density is 0.778 at 25° C. and the freezing point is below $-100°$ C.

Example I

Triallylborane, 5 g., prepared in the manner described above was heated in a 100 ml. stainless-steel bomb under 300 pounds per square inch of nitrogen at 380 to 430° C. for 190 minutes. During this time, the pressure as registered on the gauge increased 50 pounds. An analysis of the products obtained from this example showed that cracking produced hydrocarbons such as methane, ethane, ethene, propene and 1,5-hexadiene. In addition to these hydrocarbons, grey solids containing 22.7 percent boron were also obtained.

Example II

This example was performed in the same general manner as that described in Example I. In this example, 20 grams of triallylborane were pyrolyzed under 125 p.s.i.g. of nitrogen at a temperature of 300 to 316° C. for 195 minutes. A pressure increase of 30 p.s.i.g. during heating was noted. In addition to the methane, ethane, ethene, propene and 1,5-hexadiene, there was also obtained heterogeneous yellow-brown solids containing 25.3 percent boron.

Example III

In this example, 23.5 grams of triallylborane were heated under 130 p.s.i.g. of nitrogen at 300 to 325° C. for 6 hours. A pressure increase of 70 p.s.i.g. was obtained during the heating. In addition to the aforementioned hydrocarbons, grey-black solids containing 14 percent boron were also obtained.

The boron-containing solid materials produced by practicing the method of this invention can be employed as ingredients of solid propellant compositions in accordance with general procedures which are well-understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and from 65 to 90 parts by weight of oxidizer such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron-containing material can be admixed with a high solids content solution of a partially condensed urea-formaldehyde or phenol-formaldehyde resin, the proportions being such that the amount of the resin is about 5 to 10 percent by weight, based upon the weight of the oxidizer and boron compound. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

We claim:

1. A method for the preparation of solid pyrolysis products of triallylborane which comprises pyrolyzing triallylborane at a temperature from about 150° C. to 500° C. at a pressure from about 75 to 400 p.s.i.g.

2. The method of claim 1 wherein the temperature is 250° to 450° C. and the pressure is 100 to 325 p.s.i.g.

No references cited.